(12) United States Patent
Mori et al.

(10) Patent No.: US 9,064,155 B2
(45) Date of Patent: Jun. 23, 2015

(54) GUIDANCE DEVICE, GUIDANCE METHOD, AND GUIDANCE PROGRAM

(75) Inventors: Toshihiro Mori, Okazaki (JP); Yuji Sato, Owariasahi (JP)

(73) Assignee: AISIN AW CO., LTD., Anjo (JP)

( * ) Notice: Subject to any disclaimer, the term of this patent is extended or adjusted under 35 U.S.C. 154(b) by 187 days.

(21) Appl. No.: 13/821,470

(22) PCT Filed: Jan. 25, 2012

(86) PCT No.: PCT/JP2012/000461
§ 371 (c)(1),
(2), (4) Date: Mar. 7, 2013

(87) PCT Pub. No.: WO2012/111258
PCT Pub. Date: Aug. 23, 2012

(65) Prior Publication Data
US 2013/0170706 A1    Jul. 4, 2013

(30) Foreign Application Priority Data
Feb. 16, 2011    (JP) .................................. 2011-031027

(51) Int. Cl.
G06K 9/00    (2006.01)
G01C 21/36    (2006.01)

(52) U.S. Cl.
CPC ........ *G06K 9/00791* (2013.01); *G01C 21/3602* (2013.01); *G01C 21/3644* (2013.01)

(58) Field of Classification Search
None
See application file for complete search history.

(56) References Cited

U.S. PATENT DOCUMENTS

| 7,831,387 B2 * | 11/2010 | Golding et al. ............... 701/438 |
| 8,515,126 B1 * | 8/2013 | Medasani et al. ............. 382/103 |
| 8,649,565 B1 * | 2/2014 | Kim et al. ..................... 382/106 |
| 2006/0089792 A1 * | 4/2006 | Manber et al. ................ 701/207 |

(Continued)

FOREIGN PATENT DOCUMENTS

| EP | 0 782 118 A1 | 7/1997 |
| EP | 2 159 541 A1 | 3/2010 |

(Continued)

OTHER PUBLICATIONS

Bansal et al. "Vision-based Perception for Autonomous Urban Navigation" IEEE, Conference on Intelligent Transportation System. Oct. 2008.*

(Continued)

*Primary Examiner* — Jon Chang
*Assistant Examiner* — Oneal R Mistry
(74) *Attorney, Agent, or Firm* — Oliff PLC (57) ABSTRACT

Image recognition is performed based on a surrounding image and a recognition template used for the image recognition of a marker object, and a recognition confidence level used for determining if the marker object can be recognized in the surrounding image is calculated. A determination is made if the recognition confidence level has increased as compared with the recognition confidence level calculated based on the surrounding image acquired at the guidance output point. If it is determined that the recognition confidence level has increased, the image of the marker object, generated based on the surrounding image acquired at the guidance output point, is stored as a new template to be used for the image recognition of the marker object. This increases the possibility to recognize the marker object based on the new template, thus increasing the recognition accuracy of the marker object.

5 Claims, 6 Drawing Sheets

(56) References Cited

U.S. PATENT DOCUMENTS

| | | | | |
|---|---|---|---|---|
| 2007/0154067 A1* | 7/2007 | Laumeyer et al. | ............ | 382/103 |
| 2011/0153136 A1* | 6/2011 | Anderson | ...................... | 701/25 |
| 2013/0261969 A1* | 10/2013 | Nakamura et al. | ............ | 701/533 |
| 2014/0057657 A1* | 2/2014 | Manber et al. | ............. | 455/456.3 |

FOREIGN PATENT DOCUMENTS

| JP | A-2002-5668 | 1/2002 |
|---|---|---|
| JP | A-2008-309529 | 12/2008 |
| JP | A-2009-20014 | 1/2009 |

OTHER PUBLICATIONS

Wen Wu. "Multimedia Technologies for Landmark-Based Vehicle Navigation" Language Technologies Institute, School of Computer Science, CMU, 2009.*

Jan. 31, 2013 International Preliminary Report on Patentability issued in International Application No. PCT/JP2012/000461.

May 21, 2012 International Search Report issued in International Application No. PCT/JP2012/000461.

Japanese Patent Office, Notification of Reason for Refusal mailed Jan. 9, 2014 in Japanese Patent Application No. 2011-031027 w/Partial English-language Translation.

* cited by examiner

| DISTANCE TO INTERSECTION C | TARGET IMAGE | RECOGNITION CONFIDENCE LEVEL | MATCH DETERMINATION |
|---|---|---|---|
| 210 (POINT P1) | TARGET IMAGE gp | 10 | MISMATCH |
| 180 | — | 10 | MISMATCH |
| 150 | — | 20 | MISMATCH |
| 100 | — | 50 | MISMATCH |
| 50 (POINT Q) | — | 90 | MATCH |

Fig. 7A

| | RECOGNITION CONFIDENCE LEVEL OF CONVENIENCE STORE A | RECOGNITION CONFIDENCE LEVEL OF BANK B | GUIDANCE OUTPUT |
|---|---|---|---|
| FIRST TIME | 10 | 90 | BANK B |
| | PASSING TIME 90 | PASSING TIME 90 | — |
| SECOND TIME | 90 | 90 | CONVENIENCE STORE A |

Fig. 7B

|  | RECOGNITION CONFIDENCE LEVEL OF CONVENIENCE STORE A | RECOGNITION CONFIDENCE LEVEL OF BANK B | GUIDANCE OUTPUT |
|---|---|---|---|
| FIRST TIME | 10 | 90 | BANK B |
|  | PASSING TIME 80 | PASSING TIME 90 | — |
| SECOND TIME | 80 | 90 | BANK B (PRIORITY ON CONFIDENCE LEVEL)<br><br>CONVENIENCE STORE A (PRIORITY ON LOCATION) |

GUIDANCE DEVICE, GUIDANCE METHOD, AND GUIDANCE PROGRAM

TECHNICAL FIELD

The present invention relates to a guidance device, a guidance method, and a guidance program.

BACKGROUND ART

In related art, a technology is known for capturing an image of objects around a vehicle using a camera and performing image recognition of the captured image, for example. Another technology is also known for generating route guidance information, most appropriate for the driver, using only the feature objects that the driver recognizes from the objects detected based on the images ahead of a vehicle (see Japanese Patent Application Publication No. JP-A-2002-5668).

SUMMARY OF INVENTION

A feature object at a guidance target point, though recognized near the guidance target point, cannot sometimes be recognized at a point away from the guidance target point, for example, when a part of the feature object is hidden by a blocking object such as a telegraph pole or a roadside tree.

In view of the foregoing, it is an object of the present invention to provide a guidance device, a guidance method, and a guidance program capable of increasing the recognition accuracy of a marker object.

A navigation device according to a first aspect is characterized by including: a marker object identification unit that identifies a marker object, the marker object being a mark of a guidance target point on a route that is set; an image acquisition unit that acquires a surrounding image of a vehicle; a recognition confidence level calculation unit that performs image recognition based on the surrounding image and a template used for image recognition of the marker object, and calculates a recognition confidence level used to determine if the marker object can be recognized in the surrounding image; an increase determination unit that determines if the recognition confidence level calculated based on the surrounding image acquired between a guidance output point and the guidance target point has increased as compared with the recognition confidence level calculated based on the surrounding image acquired at the guidance output point, the guidance output point being a position located before the guidance target point and provided for outputting guidance on the guidance target point; and a storage unit that stores an image of the marker object, which is generated based on the surrounding image acquired at the guidance output point, as a new template for use in image recognition of the marker object if the increase determination unit determines that the recognition confidence level has increased.

In this way, with respect to a marker object whose recognition confidence level has increased as the vehicle approaches the marker object, an image of that marker object captured when the recognition confidence level is still low is added as a new template. Therefore, when the same marker object is recognized, for example, when the vehicle passes the same point again, the possibility for the marker object to be recognized based on the new template is increased, thereby increasing the recognition accuracy of the marker object.

In the invention according to a second aspect, the guidance device further includes a recognition determination unit that, based on the recognition confidence level, determines whether the marker object can be recognized at the guidance output point; and a guidance unit that outputs guidance on the guidance target point using the marker object if the recognition determination unit determines that the marker object can be recognized. This configuration allows guidance on a guidance target point to be output using the marker object.

In the invention according to a third aspect, if the recognition determination unit determines that the marker object cannot be recognized at the guidance output point, the storage unit stores an image of the marker object, generated based on the surrounding image acquired at the guidance output point, as the new template. This configuration increases the possibility for a marker object, which was not recognized at a guidance output point, to be recognized at the guidance output point, thereby increasing the recognition accuracy of the marker object.

In the invention according to a fourth aspect, if there is a plurality of the marker objects at the guidance target point and the recognition determination unit determines that the plurality of marker objects is recognized, the guidance unit outputs guidance on the guidance target point using the marker object having the highest recognition confidence level at the guidance output point. This configuration allows guidance on a guidance target point to be output more appropriately using the marker object.

In the invention according to a fifth aspect, if there is a plurality of the marker objects at the guidance target point and the recognition determination unit determines that the plurality of marker objects is recognized, the guidance unit outputs guidance on the guidance target point using the marker object having the highest priority that is set based on locations of the marker objects at the guidance target point. This configuration allows guidance on a guidance target point to be output more appropriately using the marker object.

A guidance method according to a sixth aspect is characterized by including: a marker object identification step of identifying a marker object, the marker object being a mark of a guidance target point on a route that is set; an image acquisition step of acquiring a surrounding image of a vehicle; a recognition confidence level calculation step of performing image recognition based on the surrounding image and a template used for image recognition of the marker object, and calculating a recognition confidence level used to determine if the marker object can be recognized in the surrounding image; an increase determination step of determining if the recognition confidence level calculated based on the surrounding image acquired between a guidance output point and the guidance target point has increased as compared with the recognition confidence level calculated based on the surrounding image acquired at the guidance output point, the guidance output point being a position located before the guidance target point and provided for outputting guidance on the guidance target point; and a storage step of storing an image of the marker object, which is generated based on the surrounding image acquired at the guidance output point, as a new template for use in image recognition of the marker object if the increase determination unit determines that the recognition confidence level has increased.

This method achieves the effect that is the same as or similar to that of the guidance device according to the first aspect.

A guidance program according to a seventh aspect is characterized by causing a computer to function as a marker object identification unit that identifies a marker object, the marker object being a mark of a guidance target point on a route that is set; an image acquisition unit that acquires a surrounding image of a vehicle; a recognition confidence level calculation unit that performs image recognition based on the surrounding image and a template used for image recognition of the marker object, and calculates a recognition confidence level used to determine if the marker object can be recognized in the surrounding image; an increase determination unit that determines if the recognition confidence level calculated based on the surrounding image acquired between a guidance output point and the guidance target point has increased as compared with the recognition confidence level calculated based on the surrounding image acquired at the guidance output point, the guidance output point being a position located before the guidance target point and provided for outputting guidance on the guidance target point; and a storage unit that stores an image of the marker object, which is generated based on the surrounding image acquired at the guidance output point, as a new template for use in image recognition of the marker object if the increase determination unit determines that the recognition confidence level has increased.

This program achieves the effect that is the same as or similar to that of the guidance device according to the first aspect.

DESCRIPTION OF EMBODIMENTS

A guidance device in an embodiment of the present invention will be described below with reference to the drawings.

(One )

Figure 1:
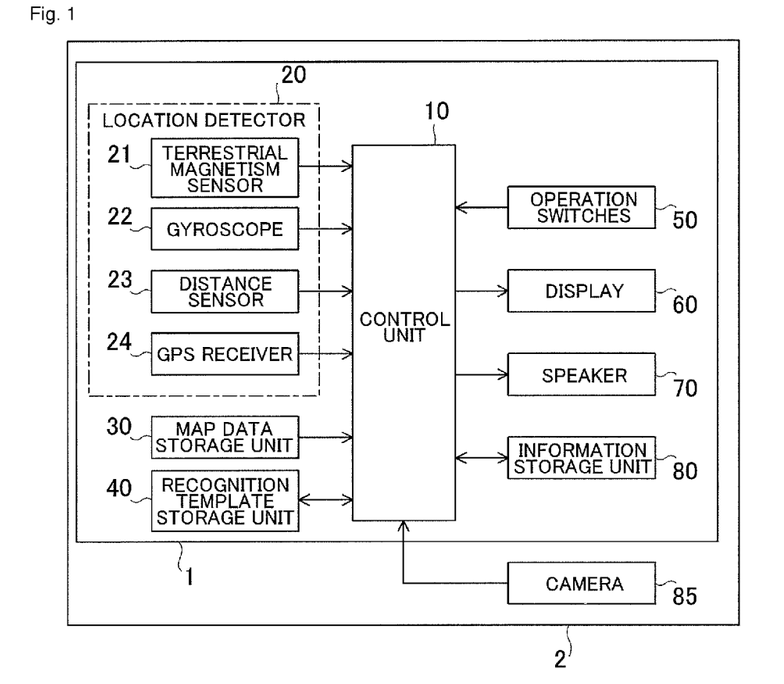
FIG. 1 is a block diagram showing the configuration of a guidance device in one embodiment of the present invention.

As shown in FIG. 1, a vehicle-mounted apparatus 1, which functions as a guidance device, is mounted on a vehicle 2.

The vehicle-mounted apparatus 1 is the so-called vehicle-mounted navigation device, but is not limited to a vehicle-mounted navigation device, and may be a device such as a mobile phone or a personal computer. The vehicle-mounted apparatus 1 includes a control unit 10, which is the key element, and the following components connected to the control unit 10: a location detector 20, a map data storage unit 30, a recognition template storage unit 40, operation switches 50, a display 60, a speaker 70, and an information storage unit 80.

The control unit 10 is configured as a standard computer, and internally includes a CPU, a ROM, a RAM, an I/O interface, and a bus line that connects those constituent components together.

The location detector 20 includes a terrestrial magnetism sensor 21, a gyroscope 22, a distance sensor 23, and a GPS (Global Positioning System) receiver 24 that receives radio waves from a satellite, all of which are known. Those sensors 21-24, which have errors different in nature, are used complementarily.

The map data storage unit 30 is a storage device implemented, for example, as a hard disk drive (HDD). Although an HDD is used in this embodiment, other mediums such as a DVD-ROM, a memory card, etc., may also be used. The map data storage unit 30 stores the so-called map matching data for increasing location detection accuracy and map data for searching for a route. The map data includes various types of data, one of which is facility information on the facilities. More specifically, the facility information is POI (Point Of Interest) information stored in association with an ID that identifies a facility. The POI information includes information on a facility name, a facility ID, location coordinates, a type (genre), an address, and a telephone number. The map data includes node data on the nodes, link data on the roads (links), and so on. Each node is stored in association with landmark information on a landmark that is an object used for the guidance of the node. The landmark information includes information indicating the location relation between the landmark and the node. For example, the landmark refers to the structures, signboards, and the road signs that are near to the node.

The recognition template storage unit 40 is configured by the same HDD as that of the map data storage unit 30. Of course, other media such as a memory card may be used. The recognition template storage unit 40 stores recognition templates for recognizing the images of landmarks. This recognition template corresponds to an "image recognition template". The recognition template may be image data or characteristic amount data.

The operation switches 50 are touch switches integrated with the display 60, mechanical switches, and remote control devices that are used for various types of input.

The display 60 is a color display device that has a screen configured by a liquid crystal panel. Maps, facility information, and so on are displayed via the display 60. The speaker 70, a voice output device, is used for outputting voice guidance on a route.

The information storage unit 80, provided to store images imaged by a camera 85 and recognition confidence levels used to determine whether a marker object can be recognized, is configured by the same HDD as that of the map data storage unit 30. Of course, other media such as a memory card may also be used.

The camera 85 is connected to the control unit 10. The camera 85 captures the images around the vehicle 2. The camera 85 in this embodiment is a front camera that captures the images ahead of the vehicle 2.

In this embodiment, a recognition template is added and updated to increase the recognition accuracy of a marker object that is the mark of a guidance target point on a route that is set.

Figure 2:
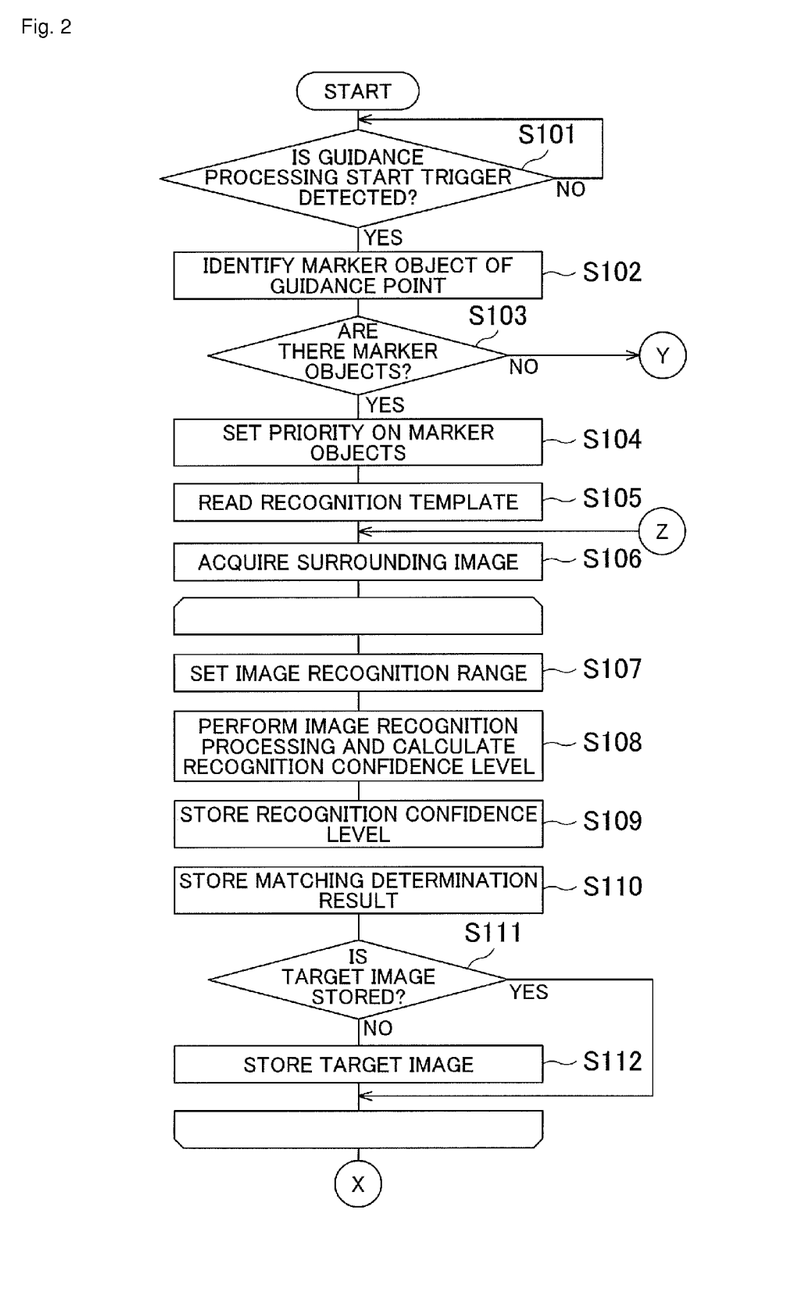
FIG. 2 is a flowchart showing the guidance processing in one embodiment of the present invention.
Figure 3:
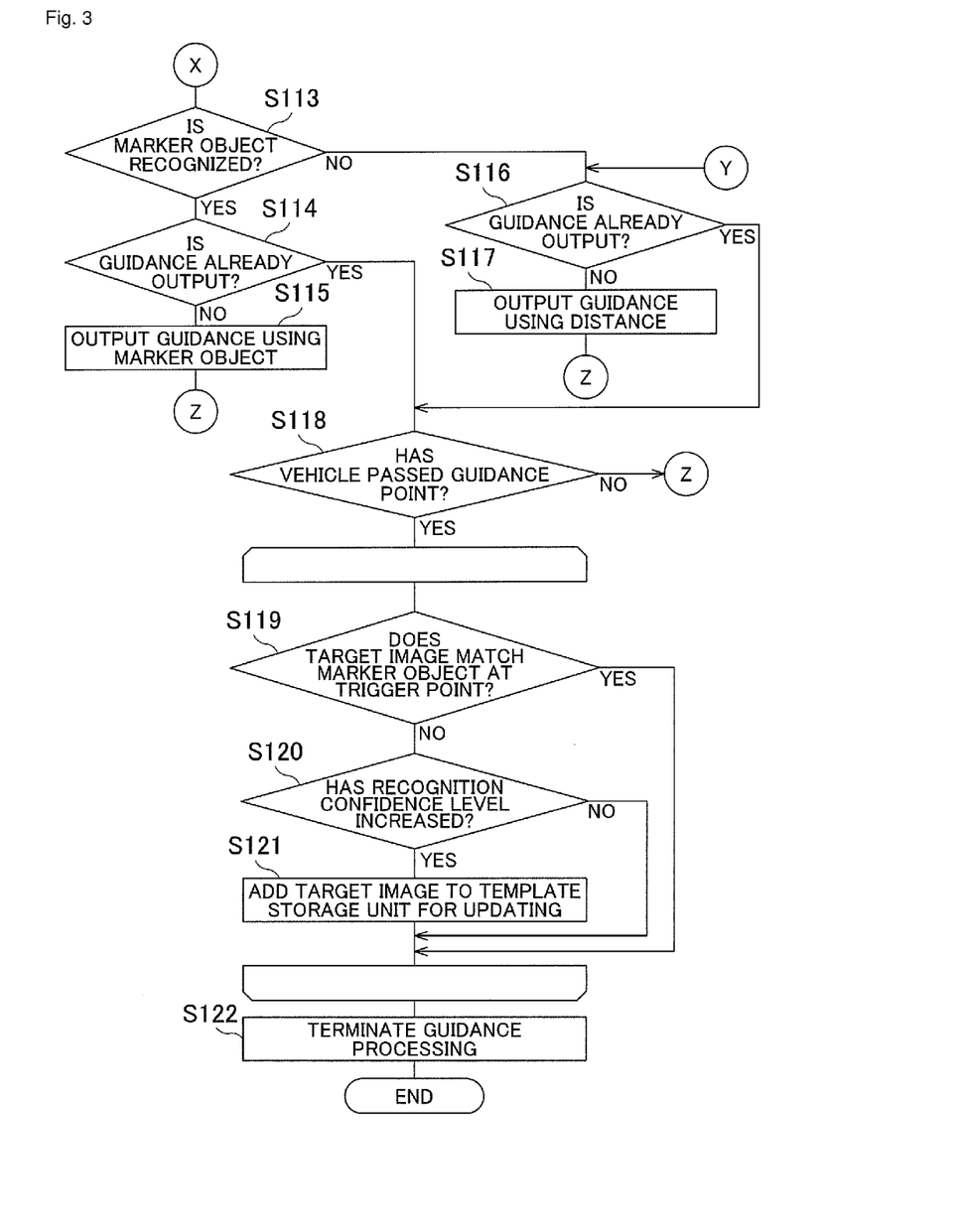
FIG. 3 is a flowchart showing the guidance processing in one embodiment of the present invention.

The following describes the guidance processing in this embodiment based on the flowchart shown in FIG. 2 and FIG. 3. Note that the guidance processing shown in FIG. 2 and FIG. 3 is performed at a predetermined interval when a vehicle is driving with a route set.

In step S101 that is the first step (in the description below, "step" is omitted and is indicated simply by the symbol "S"), the control portion 10 determines if a guidance processing start trigger is detected. For example, consider the case in which guidance on a guidance target point (hereinafter called a "guidance point") is output before the vehicle arrives at a point that is a predetermined distance (for example, 200 m) before the guidance point. In this case, considering the time required for various processing and the speaking duration, a trigger point is set before the guidance point and, when the vehicle passes the trigger point, the control portion 10 determines that the guidance processing start trigger is detected. The guidance point is, for example, an intersection at which the vehicle traveling along a route will turn right or left. If no guidance start trigger is detected (S101: NO), this determination processing is repeated. If a guidance start trigger is detected (S101: YES), control is passed to S102.

In S102, the control portion 10 references the map data storage unit 30 to identify marker objects that are the marks of the guidance point.

In S103, the control portion 10 determines if there are marker objects that are the marks of the guidance point. If it is determined that there is no marker object (S103: NO), control is passed to S116 in FIG. 3. If it is determined that there is a marker object (S103: YES), control is passed to S104.

In S104, priority is set to each of the marker objects. The priority of the marker objects is set based on the location of a marker object at the guidance point or on the user's preference. In this embodiment, the priority is set based on the location of a marker object. With respect to the traveling direction in which the vehicle 2 travels to the guidance point, the highest priority is set on a location before the guidance point and on the left side of the traveling direction, the second highest priority is set on a location beyond the guidance point and on the left side of the traveling direction, the third highest priority is set on a location before the guidance point and on the right side of the traveling direction, and the fourth highest priority is set on a location beyond the guidance point and on the right side of the traveling direction. If there is only one marker object for the guidance point, the priority is not set and control is passed to step S105 that is the next step.

In S105, the control portion 10 reads a recognition template, provided for recognizing the image of an identified marker object, from the recognition template storage unit 40. If there is a plurality of marker objects at the guidance point, the control portion 10 reads the recognition templates for the marker objects, one for each. In S106, the control portion 10 acquires the surrounding image of the vehicle 2 by the camera 85. In this embodiment, the image ahead of the vehicle 2 is acquired as the surrounding image. In addition, the control portion 10 acquires the distance between the point at which the surrounding image is acquired and the guidance point.

The processing in S107 to S112 is performed in order of descending priority that is set in S104 and for each marker object.

In S107, in the surrounding image acquired in S106, the control portion 10 sets the image recognition range for image recognition. For example, when the marker object is beyond the guidance point and on the left side of the traveling direction, a predetermined range of the top-left part of the surrounding image is set as the image recognition range. In this way, the control portion 10 sets the image recognition range based on the location of the marker object on the map, the angle of view of the camera 85, the road shape, and the vehicle behavior. Recognizing an image with the image recognition range set increases the processing speed.

In S108, based on the recognition template read in S105, the control portion 10 performs the image recognition processing for the image recognition range that is set in S107. By doing so, the control portion 10 identifies the target image, which is the image of marker object included in the acquired surrounding image, and calculates the recognition confidence level used to determine whether the marker object can be recognized in the target image. The recognition confidence level in this embodiment is a resemblance rate calculated when the target image is matched against the recognition template.

In step S109, the control portion 10 stores the recognition confidence level, calculated in S108, in the information storage unit 80. The recognition confidence level is stored in association with the distance between the point, at which the surrounding image used for the calculation of the recognition confidence level is acquired, and the guidance point.

In S110, the control portion 10 determines if the target image acquired immediately before matches the marker object based on the recognition confidence level and stores the determination result in the information storage unit 80 in association with the recognition confidence level. If the recognition confidence level is equal to or higher than a predetermined threshold (for example, 70%), the control portion 10 determines that the target image matches the marker object and stores the information, which indicates "match", as the determination result. If the recognition confidence level is smaller than the predetermined threshold, the control portion 10 determines that the target image does not match the marker object and stores the information, which indicates "mismatch", as the determination result.

In S111, the control portion 10 determines if the target image, associated with the marker object, is already stored in the information storage unit 80. If the target image is stored (S111: YES), the control portion 10 does not perform the processing of S112. If the target image is not stored (S111: NO), control is passed to S112.

In S112, the target image is stored in the information storage unit 80 in association with the marker object. If the target image is already stored, that is, if the result of S111 is YES, the target image is not stored. This means that, in this embodiment, only the first target image is stored after the vehicle passes the trigger point.

Control is passed to S113 in FIG. 3 after the processing in S107-S112 is completed for all marker objects. In S113, the control portion 10 determines if at least one marker object can be recognized. Whether a marker object can be recognized is determined based on the matching determination result stored in the information storage unit 80. If the information indicating "match" is stored for at least one marker object, it is determined that the marker object can be recognized. If the information indicating "match" is stored for none of the marker objects, it is determined that no marker object can be recognized. If no marker object can be recognized (S113: NO), control is passed to S116. If at least one marker object can be recognized (S113: YES), control is passed to S114.

In S114, the control portion 10 determines if guidance (guidance message output) on the guidance point is already output. If guidance on the guidance point is already output (S114: YES), control is passed to S118. If guidance on the guidance point is not yet output (S114: NO), control is passed to S115.

In S115, guidance on the guidance point is output using the marker object. For example, if the marker object is convenience store A and the vehicle is to turn right at the guidance point, the guidance message "Turn right at the intersection where convenience store A is located" is output via the speaker 70. In this embodiment, if a plurality of marker objects is recognized, the guidance is output using the marker object which can be recognized and to which the highest priority is assigned in S104. After that, control is passed back to S106 in FIG. 2.

Control is passed to S116 if there is no marker object at the guidance point (S103: NO) or that no marker object is recognized (S113: NO). In S116, the control portion 10 determines if guidance (guidance message output) on the guidance point is already output. If guidance on the guidance point is already output (S116: YES), control is passed to S118. If guidance on the guidance point is not yet output (S116: NO), control is passed to S117.

In S117, guidance on the guidance point is output using the distance to the guidance point. For example, if the vehicle is to turn right at the guidance point that is 200 m ahead, the guidance message "Turn right at the intersection in 200 m" is output via the speaker 70. After that, control is passed back to S106 in FIG. 2.

Control is passed to S118 if guidance on the guidance point is already output (S114: YES or S116: YES). In S118, the control portion 10 determines if the vehicle 2 has passed the guidance point. If the vehicle 2 has not yet passed the guidance point (S118: NO), control is passed back to S106 in FIG. 2. If the vehicle 2 has passed the guidance point (S118: YES), control is passed to S119.

The processing in S119 to S121 is performed for the marker objects, once for each marker object.

In S119, the control portion 10 determines if the target image acquired at the trigger point matches the marker object. If the target image, acquired at the trigger point, matches the marker object (S119: YES), the processing in S120 and S121 is not performed. If it the target image, acquired at the trigger point, does not match the marker object (S119: NO), control is passed to S120.

In S120, the control portion 10 references the recognition confidence levels stored in the information storage unit 80 to check if the recognition confidence level has increased as the vehicle approaches the guidance point. In this embodiment, if the recognition confidence level determined based on the surrounding image, acquired between the trigger point and the guidance point, is higher than a predetermined threshold, it is determined that the recognition confidence level has increased. If the recognition confidence level has not increased (S120: NO), the processing in S121 is not performed. If the recognition confidence level has increased (S120: YES), control is passed to S121.

In S121, the target image stored in the information storage unit 80, that is, the target image that is the image of the marker object generated based on the surrounding image acquired at the trigger point, is stored in the recognition template storage unit 40 as a new template of the marker object associated with the target image. In this way, the new template is added to the recognition templates, stored in the recognition template storage unit 40, for updating the recognition templates. The new template to be stored in the recognition template storage unit 40 may be image data or characteristic amount data as with the recognition template.

After the processing in S119 to S121 is completed for all marker objects, control is passed to S122 where the guidance processing is terminated. When the guidance processing is terminated, the histories of the target images and the recognition confidence levels stored in the information storage unit 80 are deleted.

Although the trigger point corresponds to "the point that is before the guidance target point and is the guidance output point for outputting guidance on the guidance target point" in this embodiment, the guidance (guidance message output) start point for the guidance point or the guidance (guidance message output) end point for the guidance point may also be regarded as the "guidance output point".

Figure 4:
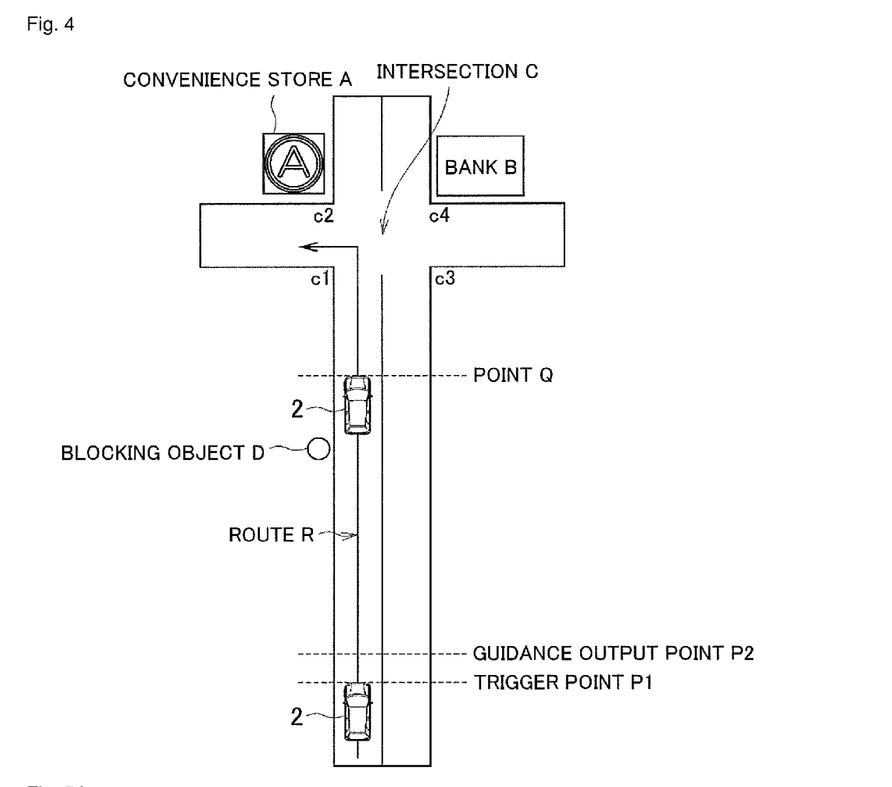
FIG. 4 is a diagram showing the update of a recognition template in one embodiment of the present invention.

The following describes an example of guidance processing in this embodiment with reference to FIG. 4.

As shown in FIG. 4, with the route R set, the vehicle 2 is traveling on the route along which the vehicle will turn left at the intersection C. That is, the intersection C is the guidance point. In order to end message output at the message output point P2 that is 200 m before the intersection C, the point that is 10 m before the message output point P2 is set as the trigger point P1.

When the vehicle 2 passes the trigger point P1 (S101), the signboard of the convenience store A (hereinafter simply called "convenience store A") and the signboard of the bank B (hereinafter simply called "bank B") are acquired as the marker objects that are the marks of the intersection C that is the guidance point (S102, S103: YES). Assume that priority is set in descending order of point c1, point c2, point c3, and point c4 at the intersection C, wherein point c1 and point c2, which are before and beyond the intersection C respectively, are on the left side and point c3 and point c4, which are before and beyond the intersection C respectively, are on the right side. Because the priority of the convenience store A at point c2 is higher than that of the bank B at point c4, the priority is set in descending order of the convenience store A and the bank B (S104). The control portion 10 reads the recognition templates of the convenience store A and the bank B from the recognition template storage unit 40 (S105). In addition, the control portion 10 acquires the image ahead of the vehicle 2 at the trigger point P1 as the surrounding image (S106) and performs the image recognition processing.

The following describes the image recognition processing for the convenience store A.

Figure 5A:
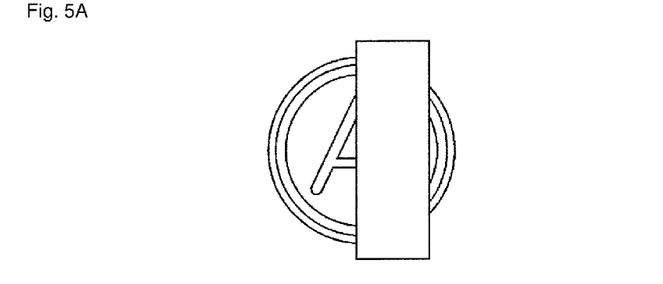
FIG. 5A is a diagram showing a target image in one embodiment of the present invention.
Figure 6:
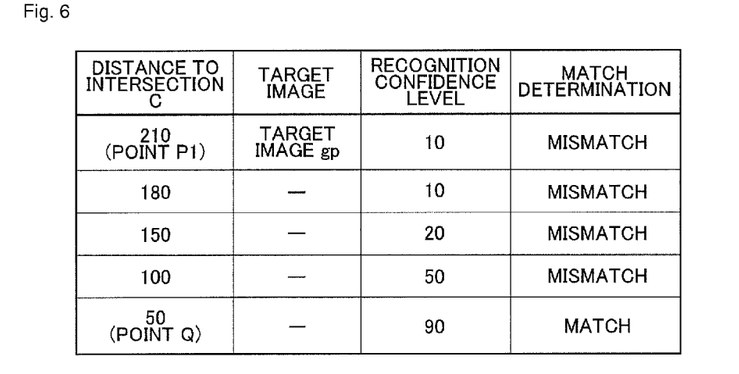
FIG. 6 is a diagram showing the distances to the intersection C and the recognition confidence levels in one embodiment of the present invention.

The control portion 10 sets the image recognition range in the surrounding image acquired at the trigger point P1 (S107), performs the image recognition processing, identifies the target image gp that is the image of the marker object, and calculates the recognition confidence level (S108). In this example, there is the blocking object D, such as a telegraph pole, ahead of the vehicle 2 that is at the trigger point P1 and, as shown in FIG. 5A, a part of the signboard of the convenience store A is hidden in the target image gp. Therefore, the recognition confidence level calculated by the image recognition processing based on the target image gp and the recognition template is 10% (S108). Because the recognition confidence level is lower than the predetermined threshold, the control portion 10 determines that the target image gp does not match the marker object (S110). Because no target image is stored at the time the vehicle 2 passes the trigger point P1 (S111: NO), the control portion 10 device stores the distance to the intersection "210 m", "target image gp", recognition confidence level "10%", and determination result "mismatch", which are associated with each other, in the information storage unit 80 (S109, S110, S112) as shown in FIG. 6.

The same processing is performed for the bank B.

Assume that the bank B is recognized as the marker object of the intersection C when the image recognition processing is performed for the surrounding image acquired at the trigger point P1 (S113: YES). In this case, using the bank B that is the recognized marker object, guidance is output, for example, by the message "Turn left at the intersection C where the bank B is located" (S115). If the bank B is not recognized as the marker object of the intersection C when the image recognition processing is performed for the surrounding image acquired at the trigger point P1 (S113: NO), guidance on the intersection C is output, for example, by the message "Turn left at the intersection C in 200 m" (S117), using the distance to the intersection C.

Figure 5B:
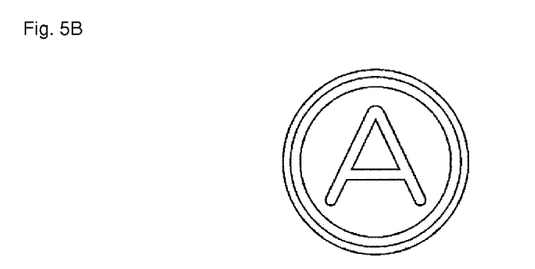
FIG. 5B is a diagram showing a target image in one embodiment of the present invention.

When the current location of the vehicle 2 is the point Q that is 50 m to the intersection C, the vehicle 2 has already passed the blocking object D that hides a part of the convenience store A. At this position, there is no blocking object anymore in front of the vehicle 2 and the target image gq is as shown in FIG. 5B. When the image recognition processing is performed based on the recognition template and the target image gq generated based on the surrounding image acquired with no blocking object between the vehicle 2 and the convenience store A that is the marker object, the recognition confidence level is increased to 90% (see FIG. 6).

FIG. 6 shows the recognition confidence levels and the match determination results of the convenience store A after the vehicle 2 passes the intersection C (S118: YES). FIG. 6 indicates that the recognition confidence level of the target image gp, acquired at the trigger point P1, is 10% that is lower than the predetermined threshold and that the recognition confidence level of the target image gq, acquired at the point Q between the trigger point P1 and the intersection C, is 90% that is higher than the predetermined threshold, meaning that the recognition confidence level has increased (S119: NO, S120:YES). Therefore, the control portion 10 stores the target image gp, which is the image acquired at the trigger point P1 and is the image of the signboard of the convenience store A where its part is hidden by the blocking object as shown in FIG. 5A, in the recognition template storage unit 40 as a new template that will be used to identify the convenience store A (S121).

Figure 7A:
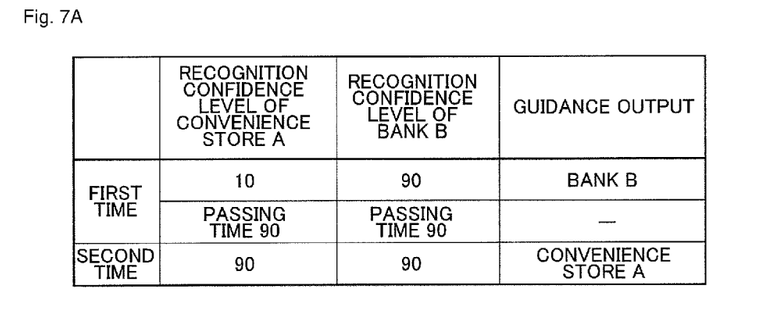
FIG. 7A is a diagram showing the recognition confidence levels when a vehicle passes the trigger point again in one embodiment of the present invention.
Figure 7B:
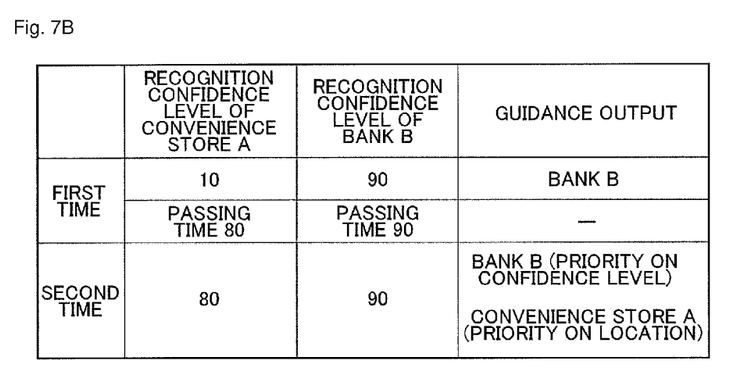
FIG. 7B is a diagram showing the recognition confidence levels when a vehicle passes the trigger point again in one embodiment of the present invention.

Referring to FIGS. 7A and 7B, the following describes the recognition confidence levels when the vehicle 2 sets a route, in which the intersection C is the guidance point, and travels along the route again.

As shown in FIG. 7A, assume that the recognition confidence level of the convenience store A is 10%, and that of the bank B is 90%, when the vehicle 2 passes the trigger point P1 for the first time. In this case, guidance on the intersection C is output using the bank B. Because the recognition confidence level of the convenience store A increases from 10% to 90% when the vehicle 2 passes the intersection C for the first time (S119: NO, S120: YES), the target image gp of the convenience store A, which is generated based on the surrounding image acquired at the trigger point P1, is stored in the recognition template storage unit 40 as a new template (S121).

The target image gp generated when the vehicle passes the trigger point P1 for the first time is stored in the recognition template storage unit 40 as a new template. Therefore, when the vehicle 2 passes the trigger point P1 again, the image recognition processing is performed using the target image gp that has been added as the new template. In this case, the recognition confidence level of the convenience store A included in the surrounding image acquired in the trigger point P1 is 90%, with the result that the control portion 10 determines that the target image matches the marker object. When the vehicle 2 passes the trigger point P1 again, the convenience store A can be recognized at the trigger point P1 (S113: YES). Therefore, guidance such as "Turn left at the intersection C where the convenience store A is located" can be output using the convenience store A, located at a position with priority higher than that of the bank B, based on the priority that is set based on the locations of the marker objects. At another point where a part of the convenience store A is hidden similarly by a blocking object, image recognition is performed using the target image gp, added as the new template, thus increasing the recognition confidence level from a point distant from the guidance point.

For the bank B, the recognition confidence level of the image included in the surrounding image, acquired at the trigger point P1 for the first time, is so high that it is determined that the target image matches the marker object (S119: YES) with the result that a new template is not added for updating.

If the recognition confidence levels at the trigger point P1 vary according to the marker objects as shown in FIG. 7B, the guidance device may be configured to output guidance using the convenience store A that has the highest priority as determined by the locations of marker objects or may be configured to output guidance using the bank B that has the highest recognition confidence level.

As described above in detail, according to this embodiment, the control portion 10 identifies marker objects, which are the marks of guidance points on a route that is set (S102 in FIG. 2), and acquires the surrounding image of the vehicle 2 (S106). Image recognition is performed based on a recognition template and the surrounding image to recognize a marker object, and the recognition confidence level that will be used to determine if the marker object can be recognized in the surrounding image is calculated (S108). The control portion 10 determines if the recognition confidence level, calculated based on the surrounding image acquired between the trigger point and the guidance point, has increased as compared with the recognition confidence level calculated based on surrounding image acquired at the trigger point. If the recognition confidence level has increased (S120 in FIG. 3: YES), the control portion 10 stores the image of the marker object, generated based on the surrounding image acquired at the trigger point, as a new template that will be used for the image recognition of the marker object (S121).

In this way, with respect to a marker object whose recognition confidence level has increased as the vehicle 2 approaches the marker object, an image of the marker object captured when the recognition confidence level is still low is added as a new template. Therefore, if the same marker object is recognized, for example, when the vehicle 2 passes the same point again, the possibility for the marker object to be recognized based on the new template is increased, thereby increasing the recognition accuracy of the marker object.

If a marker object is recognized at the trigger point based on the recognition confidence level (S113: YES), guidance on the guidance point is output using the marker object (S115). This allows guidance on the guidance target point to be output appropriately using the marker object.

In this embodiment, if it is determined that a marker object cannot be recognized at a trigger point (S119: NO) and it is also determined that the recognition confidence level has increased (S120: YES), the control portion 10 stores the image of the marker object, generated based on the surrounding image acquired at the trigger point, as a new template (S121). Adding a new template in this way increases the possibility for a marker object, which was not recognized at a trigger point, to be recognized at the trigger point, thereby increasing the recognition accuracy of the marker object. The ability to recognize a marker object at a trigger point allows guidance to be output using the marker object, increasing the user convenience. In addition, in this embodiment, if a marker object can be recognized at a trigger point (S119: YES), the new template is not added for updating. If the marker object can be recognized at a trigger point, the need to add a new template is eliminated, which suppresses an increase in the usage amount of a memory and the like that is caused by adding a new template.

If there is a plurality of marker objects at a guidance target point and the plurality of marker objects can be recognized, guidance on the guidance point is output using the marker object having the highest priority as determined by the locations of the marker objects at the guidance point. This allows guidance on the guidance point to be output more appropriately using the marker object at the location the user can recognize most easily.

If there is a plurality of marker objects at a guidance target point and the plurality of marker object is recognized as shown in FIG. 7B, the guidance device may be configured to output guidance using the marker object that has the highest recognition confidence level at the trigger point. This allows guidance to be output more appropriately using the marker object that is most likely recognized by the user.

In this embodiment, the control unit 10 configures a "marker object identification unit", "image acquisition unit", "recognition confidence level calculation unit", "increase determination unit", "storage unit", "recognition determination unit", and "guidance unit". S102 in FIG. 2 corresponds to the processing performed by the function of the "marker object identification unit", S106 corresponds to the processing performed by the function of the "image acquisition unit", S120 in FIG. 3 corresponds to the processing performed by the function of the "increase determination unit", and S121 corresponds to the processing performed by the function of the "storage unit". S113 or S119 corresponds to the processing performed by the function of the "recognition determination unit", and S115 corresponds to the processing performed by the function of the "guidance unit".

(Another Embodiment)

In the embodiment described above, if a target image acquired at a trigger point does not match the marker object and if the recognition confidence level has increased, the target image acquired at the trigger point is stored as a new template. In another embodiment, the processing in S119 in FIG. 3 may be omitted, and regardless of whether or not the target image, which is generated based on the surrounding image acquired at the trigger point, matches the marker object, the target image of the marker object may be stored as a new template if the recognition confidence level has increased between the trigger point and the guidance point.

In the embodiment described above, it is determined that the recognition confidence level has increased in S120 if the recognition confidence level is higher than a predetermined threshold. In another embodiment, it is also possible that, regardless of whether or not the recognition confidence level is higher than a predetermined threshold, a new template is stored if the recognition confidence level calculated based on the surrounding image acquired between the trigger point and the guidance point is higher than the recognition confidence level calculated based on the surrounding image acquired at the trigger point.

In the embodiment described above, the control unit 10 configures the "marker object identification unit", "image acquisition unit", "recognition confidence level calculation unit", "increase determination unit", "storage unit", "recognition determination unit", and "guidance unit". In another embodiment, those units may be implemented as a program that causes a computer to function as those units or may be implemented as a storage medium that stores the program. Those units may also be implemented as a navigation method that performs the "marker object identification step", "image acquisition step", "recognition confidence level calculation step", "increase determination step", "storage step", "recognition determination step", and "guidance step".

As described above, it is to be understood that the present invention is not limited to the embodiments described above but can be implemented in various forms in the scope without departing from the spirit of the present invention.

The invention claimed is:

1. A guidance device comprising:
a marker object identification unit that identifies a marker object, the marker object being a mark of a guidance target point on a route that is set; an image acquisition unit that acquires a surrounding image of a vehicle; a recognition confidence level calculation unit that performs image recognition based on the surrounding image and a template used for image recognition of the marker object, and calculates a recognition confidence level used to determine if the marker object can be recognized in the surrounding image;
an increase determination unit that determines if the recognition confidence level calculated based on the surrounding image acquired between a guidance output point and the guidance target point has increased as compared with the recognition confidence level calculated based on the surrounding image acquired at the guidance output point, the guidance output point being a position located before the guidance target point and provided for outputting guidance on the guidance target point; a storage unit that stores an image of the marker object, which is generated based on the surrounding image acquired at the guidance output point, as a new template for use in image recognition of the marker object if the increase determination unit determines that the recognition confidence level has increased;
a recognition determination unit that, based on the recognition confidence level, determines whether the marker object can he recognized at the guidance output point; and
a guidance unit that outputs guidance on the guidance target point using the marker object if the recognition determination unit determines that the marker object can be recognized, wherein
if the recognition determination unit determines that the marker object cannot be recognized at the guidance output point, the storage unit stores an image of the marker object, generated based on the surrounding image acquired at the guidance output point, as the new template; and
if the recognition determination unit determines that the marker object can be recognized at the guidance output point, the storage unit does not stores an image of the marker object as the new template.

2. The guidance device according to claim 1, wherein
if there is a plurality of the marker objects at the guidance target point and the recognition determination unit determines that the plurality of marker objects is recognized, the guidance unit outputs guidance on the guidance target point using the marker object having the highest recognition confidence level at the guidance output point; and
if there is a single marker object that the recognition determination unit determines can be recognized, the guidance unit that outputs guidance on the guidance target point using the recognized marker object.

3. The guidance device according to claim 1, wherein
if there is a plurality of the marker objects at the guidance target point and the recognition determination unit determines that the plurality of marker objects is recognized, the guidance unit outputs guidance on the guidance target point using the marker object having the highest priority that is set based on locations of the marker objects at the guidance target point; and if there is a single marker object that the recognition determination unit determines can be recognized, the guidance unit that outputs guidance on the guidance target point using the recognized marker object.

4. A guidance method comprising:
a marker object identification step of identifying a marker object, the marker object being a mark of a guidance target point on a route that is set; an image acquisition step of acquiring a surrounding image of a vehicle;
a recognition confidence level calculation step of performing image recognition based on the surrounding image and a template used for image recognition of the marker object, and calculating a recognition confidence level used to determine if the marker object can be recognized in the surrounding image;
an increase determination step of determining if the recognition confidence level calculated based on the surrounding image acquired between a guidance output point and the guidance target point has increased as compared with the recognition confidence level calculated based on the surrounding image acquired at the guidance output point, the guidance output point being a position located before the guidance target point and provided for outputting guidance on the guidance target point;
a storage step of storing an image of the marker object, which is generated based on the surrounding image acquired at the guidance output point, as a new template for use in image recognition of the marker object if in the increase determination step it is determined that the recognition confidence level has increased;
a recognition determination step of determining, based on the recognition confidence level, whether the marker object can be recognized at the guidance output point; and
a guidance step of outputting guidance on the guidance target point using the marker object if in the recognition determination step it is determined that the marker object can be recognized, wherein
if in the recognition determination step it is determined that the marker object cannot be recognized at the guidance output point, in the storage step an image of the marker object, generated based on the surrounding image acquired at the guidance output point, is stored as the new template; and
if the recognition determination unit determines that the marker object can be recognized at the guidance output point, the storage unit does not store an image of the marker object as the new template.

5. A non-transitory computer-readable storage medium storing a computer-executable guidance program, the program causing a computer to function as:
a marker object identification unit that identifies a marker object, the marker object being a mark of a guidance target point on a route that is set; an image acquisition unit that acquires a surrounding image of a vehicle; a recognition confidence level calculation unit that performs image recognition based on the surrounding image and a template used for image recognition of the marker object, and calculates a recognition confidence level used to determine if the marker object can he recognized in the surrounding image;
an increase determination unit that determines if the recognition confidence level calculated based on the surrounding image acquired between a guidance output point and the guidance target point has increased as compared with the recognition confidence level calculated based on the surrounding image acquired at the guidance output point, the guidance output point being a position located before the guidance target point and provided for outputting guidance on the guidance target point; a storage unit that stores an image of the marker object, which is generated based on the surrounding image acquired at the guidance output point, as a new template for use in image recognition of the marker object if the increase determination unit determines that the recognition confidence level has increased;
a recognition determination unit that, based on the recognition confidence level, determines whether the marker object can be recognized at the guidance output point; and
a guidance unit that outputs guidance on the guidance target point using the marker object if the recognition determination unit determines that the marker object can be recognized, wherein
if the recognition determination unit determines that the marker object cannot be recognized at the guidance output point, the storage unit stores an image of the marker object, generated based on the surrounding image acquired at the guidance output point, as the new template; and
if the recognition determination unit determines that the marker object can be recognized at the guidance output point, the storage unit does not store an image of the marker object as the new template.

* * * * *